United States Patent
Yang

(10) Patent No.: US 11,910,377 B2
(45) Date of Patent: Feb. 20, 2024

(54) METHOD AND APPARATUS FOR REQUESTING SCHEDULING SIDELINK RESOURCE, AND STORAGE MEDIUM

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 406 days.

(21) Appl. No.: 17/298,492

(22) PCT Filed: Nov. 30, 2018

(86) PCT No.: PCT/CN2018/118599
§ 371 (c)(1),
(2) Date: May 28, 2021

(87) PCT Pub. No.: WO2020/107410
PCT Pub. Date: Jun. 4, 2020

(65) Prior Publication Data
US 2022/0030602 A1    Jan. 27, 2022

(51) Int. Cl.
*H04W 72/12* (2023.01)
*H04W 72/1263* (2023.01)
(Continued)

(52) U.S. Cl.
CPC ... *H04W 72/1263* (2013.01); *H04W 72/0453* (2013.01); *H04W 72/121* (2013.01); *H04W 76/20* (2018.02)

(58) Field of Classification Search
CPC ......... H04W 72/1263; H04W 72/0453; H04W 72/121; H04W 76/20; H04W 72/20; H04W 76/11; H04W 76/14; H04W 72/0446
See application file for complete search history.

(56) References Cited

U.S. PATENT DOCUMENTS 10,764,890 B2 *  9/2020  Lee ................. H04W 72/20
2018/0199312 A1 *  7/2018  Wu .................. H04B 7/155
(Continued)

FOREIGN PATENT DOCUMENTS

| CN | 106686551 A | 5/2017 |
|---|---|---|
| CN | 106792430 A | 5/2017 |
| WO | WO 2017166961 A1 | 10/2017 |

OTHER PUBLICATIONS

Rao et al. provisional patent application in the United States, with U.S. Appl. No. 62/769,371, filed Nov. 19, 2018 (Year: 2018).*

(Continued)

*Primary Examiner* — Wutchung Chu
(74) *Attorney, Agent, or Firm* — COZEN O'CONNOR

(57) ABSTRACT

The present disclosure relates to a method and apparatus for requesting scheduling sidelink resources, and a storage medium. The method is applied to a terminal device, and includes: sending a sidelink terminal message to a network device, wherein the sidelink terminal message comprises a request initiated by the terminal device for performing sidelink resource scheduling by the terminal device; receiving a response message corresponding to the sidelink terminal message sent by the network device; in response to that the response message is a first response message indicating that the request from the terminal device is approved, obtaining assigned sidelink resource configuration information from the first response message; and performing sidelink resource scheduling for respective terminal devices within a user group including the terminal device based on the assigned sidelink resource configuration information.

16 Claims, 4 Drawing Sheets

(51) Int. Cl.
*H04W 76/20* (2018.01)
*H04W 72/0453* (2023.01)
*H04W 72/121* (2023.01)

(56) References Cited

U.S. PATENT DOCUMENTS

| | | | |
|---|---|---|---|
| 2018/0302779 A1* | 10/2018 | Fujishiro | H04W 72/23 |
| 2019/0223241 A1* | 7/2019 | Manolakis | H04W 72/542 |
| 2019/0274121 A1* | 9/2019 | Wu | H04L 5/0092 |
| 2019/0335532 A1* | 10/2019 | Kim | H04W 72/02 |
| 2020/0092685 A1* | 3/2020 | Fehrenbach | H04W 84/047 |
| 2020/0146094 A1* | 5/2020 | Wu | H04W 4/40 |
| 2020/0163005 A1* | 5/2020 | Rao | H04W 4/46 |
| 2020/0196279 A1* | 6/2020 | Thomas | H04W 72/04 |
| 2021/0250802 A1* | 8/2021 | Zheng | H04W 74/006 |
| 2021/0258853 A1* | 8/2021 | Wang | H04W 28/0268 |
| 2021/0266992 A1* | 8/2021 | Kim | H04M 15/49 |

OTHER PUBLICATIONS

Wu et al. provisional patent application in the United States, with U.S. Appl. No. 62/769,371, filed Nov. 19, 2018 (Year: 2018).*
PCT/CN2018/118599 English translation of the International Search Report dated Mar. 28, 2019, 2 pages.

* cited by examiner

METHOD AND APPARATUS FOR REQUESTING SCHEDULING SIDELINK RESOURCE, AND STORAGE MEDIUM

CROSS-REFERENCE TO RELATED APPLICATION

This application is a U.S. national phase of International Application No. PCT/CN2018/118599, filed with the State Intellectual Property Office of P. R. China on Nov. 30, 2018, the content of which is incorporated herein by reference in its entirety.

TECHNICAL FIELD

The present disclosure relates to a field of resource scheduling, and more particularly, to a method for requesting scheduling sidelink resources, an apparatus for requesting scheduling sidelink resources and a storage medium.

BACKGROUND

In the 4G communication system, in order to support direct communication between a user equipment (UE) and another user equipment, a sidelink communication mode is introduced. A protocol stack for the sidelink communication mode is shown in FIG. 1, and an interface between UEs is PC-5. Addressing of the sidelink transmission is realized by a source identifier and a target identifier of the MAC layer, without establishing a connection before the transmission.

In related arts, in the sidelink communication system, there are two modes for scheduling radio resources. One mode is UE autonomous selecting mode based on resource pools, the other mode is dynamic scheduling mode based on network. When there is a network coverage, the resource pool is allocated by the network for each UE. UE is configured with a preconfigured resource pool when the UE is out of network coverage. Thus, a network device such as a base station is typically required to allocate the resources to terminal devices. Consequently, terminal device cannot autonomously perform resource scheduling for other terminal devices.

SUMMARY

In order to overcome problems in the related art, the present disclosure provides a method and an apparatus for requesting scheduling sidelink resources and a storage medium.

According to a first aspect of embodiments of the present disclosure, there is provided a method for requesting scheduling sidelink resources. The method is applicable to a terminal device and includes: sending a sidelink terminal message to a network device, in which the sidelink terminal message includes a request initiated by a terminal device for performing sidelink resource scheduling by the terminal device; receiving a response message corresponding to the sidelink terminal message sent by the network device; when the response message is a first response message indicating that the request from the terminal device is approved, obtaining assigned sidelink resource configuration information from the first response message; and performing sidelink resource scheduling for respective terminal devices within a user group including the terminal device based on the assigned sidelink resource configuration information.

According to a second aspect of embodiments of the present disclosure, there is provided an apparatus for requesting scheduling sidelink resources. The apparatus includes a requesting module, a receiving module, an obtaining module and a scheduling module. The requesting module is configured to send a sidelink terminal message to a network device, in which the sidelink terminal message includes a request initiated by a terminal device for performing sidelink resource scheduling by the terminal device. The receiving module is configured to receive a response message corresponding to the sidelink terminal message sent by the network device. The obtaining module is configured to, when the response message is a first response message indicating that the request from the terminal device is approved, obtain assigned sidelink resource configuration information from the first response message. The scheduling module is configured to perform sidelink resource scheduling for respective terminal devices within a user group including the terminal device based on the assigned sidelink resource configuration information.

According to a third aspect of embodiments of the present disclosure, there is provided a device for requesting scheduling sidelink resources, including a processor and a memory for storing instructions executable by the processor, in which the processor is configured to implement steps in any method described in the first aspect.

According to a fourth aspect of embodiments of the present disclosure, there is provided a non-transitory computer readable storage medium, when instructions in the storage medium are executed by a processor, the processor is caused to implement steps in any method described in the first aspect.

The above summary and the following details of the present disclosure are explanatory and illustrative, which shall not be construed to limit the present disclosure.

BRIEF DESCRIPTION OF THE DRAWINGS

The drawings are incorporated in the specification and form a part of the specification, which illustrate embodiments conforming to the present disclosure. The drawings together with the specification explain the principle of the present disclosure

DETAILED DESCRIPTION

Figure 1:
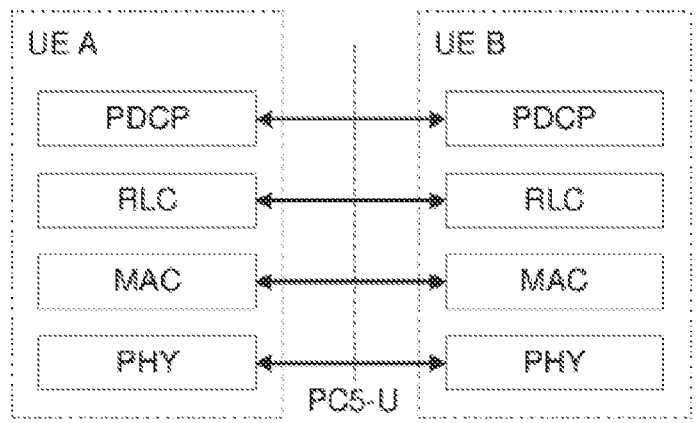
FIG. 1 is a schematic diagram of a protocol stack for a sidelink communication mode according to an embodiment of the present disclosure.

Embodiments of the present disclosure will be described in detail below with reference to the following drawings. Unless specified or limited otherwise, the same or similar elements and the elements having same or similar functions are denoted by like reference numerals throughout the descriptions. The implementations in the following embodiments do not represent all implementations conforming to the present disclosure. Instead, the implementations in the following embodiments are merely examples of the apparatus and method described in the claims and in some aspect of the present disclosure.

The present disclosure provides a method for requesting scheduling sidelink resources. The method is applicable in a terminal device, such as a mobile phone, a smart watch, a smart bracelet of a user. Once the terminal device performs communication with other devices, the method for requesting scheduling sidelink resources according to the embodiments of the present disclosure may be performed. According to embodiments of the present disclosure, a request for performing resource scheduling by UE may be sent to a network device, in response to that the network device approves, the resource scheduling may be performed for respective terminal devices within a user group based on resources assigned by the network device without the terminal devices requesting for respective resources from the network device respectively, such that a pressure of the network device is relieved while realizing reasonable assignment and scheduling of network resources.

Figure 2:
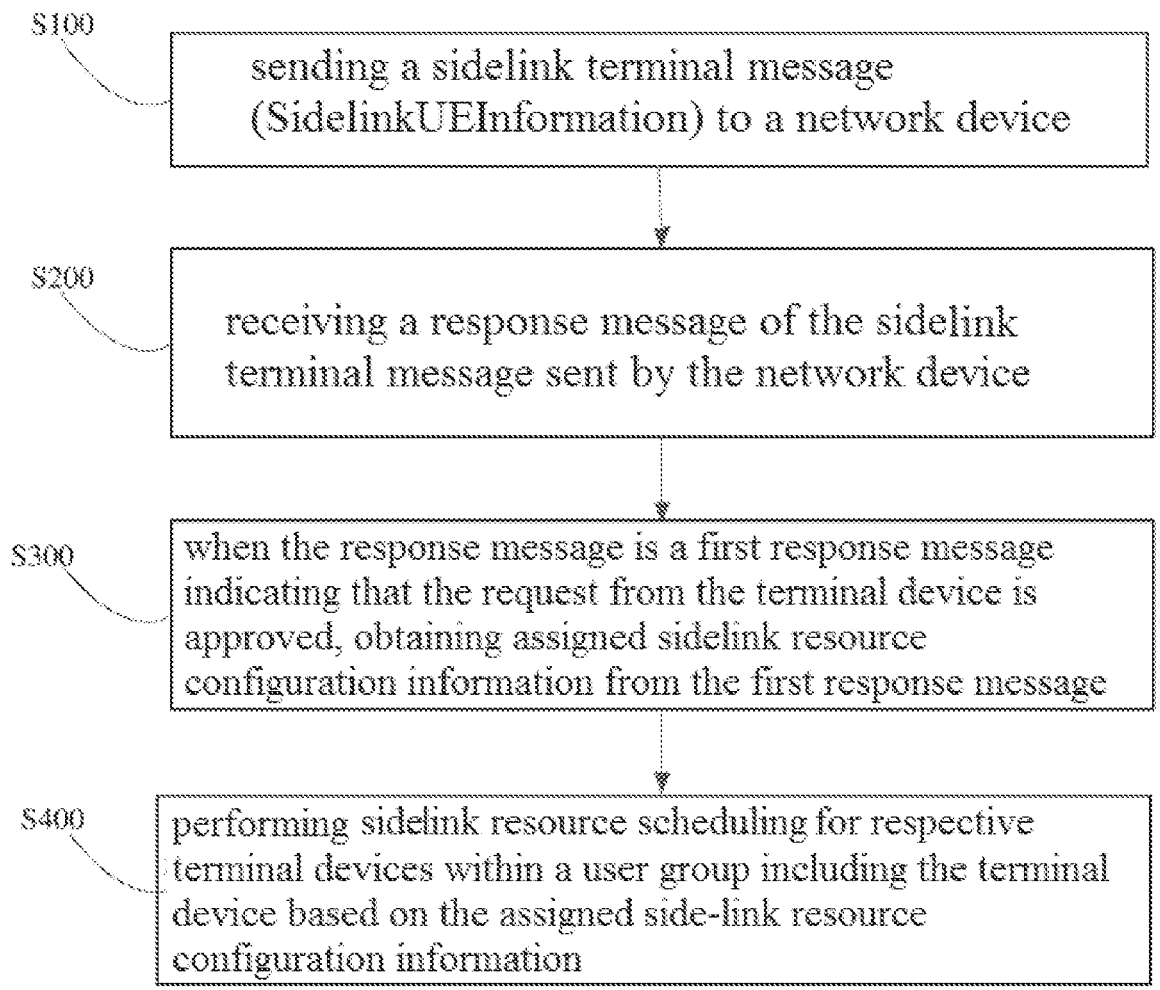
FIG. 2 is a schematic flowchart of a method for requesting scheduling sidelink resources according to an embodiment of the present disclosure.

FIG. 2 is a schematic flowchart of a method for requesting scheduling sidelink resources according to an embodiment of the present disclosure. As illustrated in FIG. 2, the method may include the following.

At block S100, a sidelink terminal message (SidelinkUEInformation) is sent to a network device. The sidelink terminal information includes a request initiated by a terminal device for performing sidelink resource scheduling by the terminal device.

At block S200, a response message corresponding to the sidelink terminal message sent by the network device is received.

At block S300, in response to the response message being a first response message indicating that the request from the terminal device is approved, assigned sidelink resource configuration information is obtained from the first response message.

At block S400, sidelink resource scheduling is performed for respective terminal devices within a user group including the terminal device based on the assigned sidelink resource configuration information.

In the embodiment of the present disclosure, terminal devices in the network may be grouped into more than one user groups. Each user group may include a plurality of terminal devices. Both the communication between terminal devices within the user group and the communication between terminal devices in different user groups are performed by assigned sidelink resources. Sidelink resource pools include a transmitting resource pool and a receiving resource pool, which respectively indicate a time range and a frequency range of radio resources for sidelink transmitting and receiving. In other words, data transmitting and receiving may be performed at a corresponding time and with a corresponding frequency.

According to embodiments of the present disclosure, a request for performing resource scheduling by a terminal device within the user group may be sent to a network device by the terminal device. In response to the network device approving the request, the terminal device may be configured to perform the sidelink resource scheduling for respective terminal devices within the user group.

In a possible embodiment, each terminal device within the user group may send the request for performing the sidelink resource scheduling by the terminal device to the network device, or only an authorized terminal device within the user group may send the request for performing the sidelink resource scheduling by the authorized terminal device to the network device, which are not limited herein. However, it should be noted that when the network device approves the request for performing sidelink resource scheduling by the terminal device from one terminal device within the user group, the network device may reject the request from another terminal device for performing sidelink resource scheduling by the terminal device within a certain time period.

Further, in the embodiment of the present disclosure, in response to a terminal device within the user group receiving broadcast information from the network device, the terminal device may send the request for performing sidelink resource scheduling by the terminal device to the network device. For example, in response to a terminal device within the user group receiving information such as SIB18, SIB19, SIB21 sent by the network device, the terminal device may determine whether to send SidelinkUEInformation based on the received broadcast information.

In detail, in some possible embodiments, the terminal device may send SidelinkUEInformation to the network device (such as base station) when it needs to request for performing sidelink resource scheduling by UE (such as terminal device) to the network device. SidelinkUEInformation may include the request initiated by the terminal device for performing sidelink resource scheduling by the terminal device. The network device may determine whether to approve that the scheduling is performed by the terminal device based on the request.

Further, SidelinkUEInformation may further include an identifier of the terminal device, a group identifier of the user group including the terminal device, an identifier of each terminal device within the user group, and the number of terminal devices for which the sidelink resources need to be scheduled within the user group, such that the network device may determine the terminal device, the user group including the terminal device and a size of resources to be assigned during resource assignment. The identifier of the terminal device may uniquely correspond to the terminal device, and the group identifier of the user group may uniquely correspond to the user group. Based on the group identifier, the network device may query situations of the terminal devices within the user group.

Before the terminal device sends SidelinkUEInformation, it needs to determine the terminal devices for which the sidelink resources need to be scheduled within the user group. Assuming that the terminal device sending SidelinkUEInformation is a first terminal device and other terminal devices are considered as second terminal devices, the second terminal devices for which the sidelink resources need to be scheduled within the user group may be determined as follows.

Querying information may be sent to each second terminal device to determine whether the sidelink resource needs to be scheduled for the second terminal device by the first terminal device. If return information indicating that the sidelink resource needs to be scheduled for the second terminal device is received from the second terminal device, it is determined that the sidelink resource needs to be scheduled for the second terminal device.

In some embodiments, the first terminal device may receive a request for sidelink resources from the second terminal device, i.e., the second terminal device may actively send the request for sidelink resources to the first terminal device. When the request is received, the first terminal device may determine that the sidelink resource needs to be scheduled for the second terminal device.

Through the above configuration, the second terminal devices for which the sidelink resources need to be scheduled within the user group may be determined. In this case, the identifier of the second terminal device for which the sidelink resource needs to be scheduled may be recorded, and the number of the second terminal devices for which the sidelink resources need to be scheduled within the user group may be recorded. When sending SidelinkUEInformation to the network device, SidelinkUEInformation may carry the number of terminal devices for which the sidelink resources need to be scheduled.

After sending SidelinkUEInformation to the network device, a response from the network device may be expected, i.e., the response message corresponding to the sidelink terminal message sent by the network device may be received. In the embodiment of the present disclosure, the network device may determine whether to approve the request of the terminal device based on a configuration situation of the sidelink resource pools. The network work may also obtain the number of terminal devices within the user group from SidelinkUEInformation, or the network device may determine the user groups based on the identifiers of the user groups in SidelinkUEInformation and assign corresponding sidelink resources for the user group.

The response message received from the network device may be the first response message indicating that the request from the terminal device is approved. The terminal device may extract sidelink resource configuration information assigned to the user group from the first response message, obtain the time range and the frequency range corresponding to assigned sidelink resources from the sidelink resource configuration information and perform the sidelink resource scheduling for respective terminal devices within the user group based on the assigned sidelink resources.

After the network device receives SidelinkUEInformation sent by the terminal device, if it approves the resource scheduling and assignment based on UE, the network device sends RRCConnectionReconfiguration (radio resource control connection reconfiguration) or RRCReconfiguration (radio resource control configuration) to the terminal device, carrying an indicator of approving the terminal device to enable the mode of performing resource scheduling by UE and a transmitting resource pool configuration, such that the terminal device may perform the resource scheduling for other terminal devices within the user group.

Figure 3:
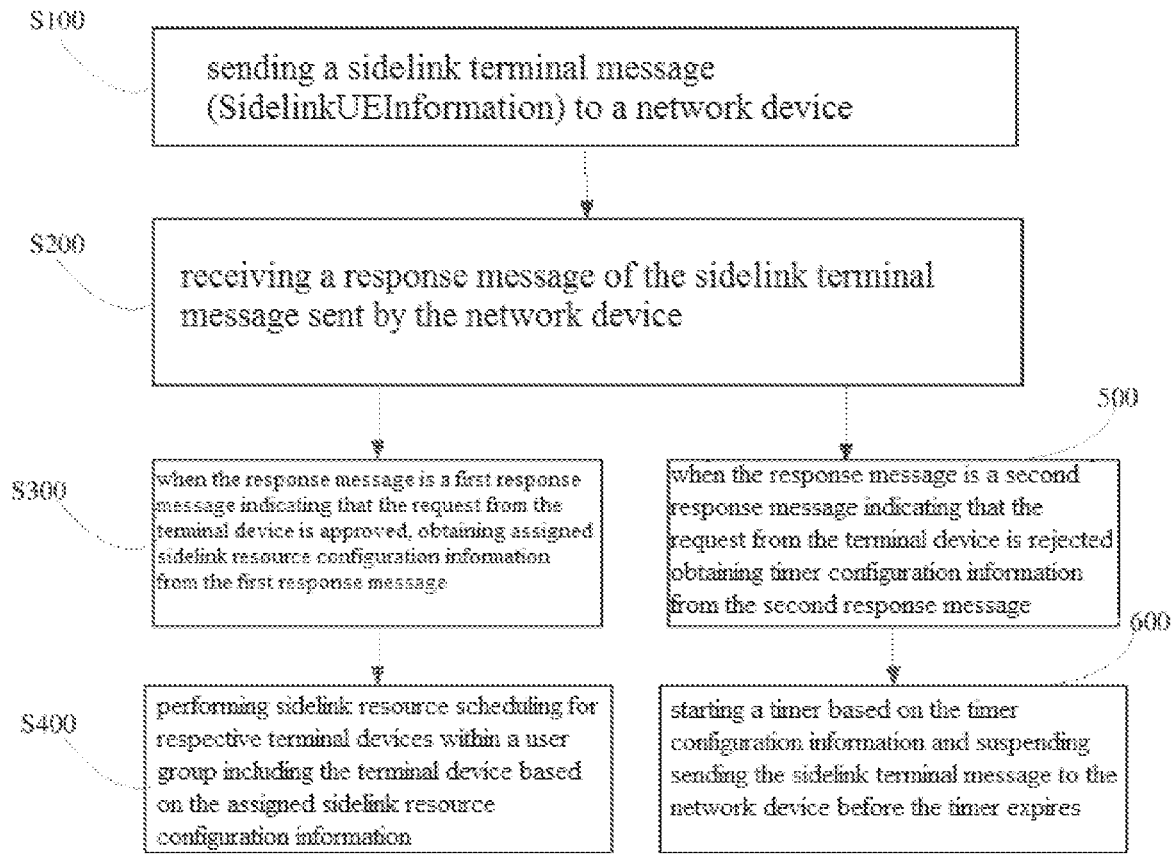
FIG. 3 is another schematic flowchart of a method for requesting scheduling sidelink resources according to an embodiment of the present disclosure.

FIG. 3 is another schematic flowchart of a method for requesting scheduling sidelink resources according to an embodiment of the present disclosure.

As illustrated in FIG. 3, based on the embodiment shown in FIG. 2, the method may further include the following.

At block S500, in response to the response message being a second response message indicating that the request from the terminal device is rejected, timer configuration information is obtained from the second response message.

At block S600, a timer is started based on the timer configuration information, and sending of the sidelink terminal message to the network device is suspended before a timing time of the timer expires.

In the embodiment of the present disclosure, after the terminal device sends the sidelink terminal message to the network device, if the network device cannot assign corresponding resources to the user group based on a usage of the resource pools, or the network device rejects the request of the terminal device due to other factors, the network device may send the second response message to the terminal device. The second response message may carry the timer configuration information, such as a timing length, or a starting timing time to an ending timing time. The timing time of the timer may be set by the network device, or may be preconfigured, which is not limited herein. When the terminal device receives the second response message indicating that the request from the terminal device is rejected, the timer configuration information may be obtained from the second response message. The timer may be started, and the terminal device does not send any sidelink terminal message to the network device within the timing time of the timer. After the timing time expires, the terminal device may send the sidelink terminal message again according to requirements to request for performing the resource scheduling by the terminal device.

After the network device receives SidelinkUEInformation sent by the UE in step S100, if the network device does not approve the mode of performing resource scheduling by UE, the network device may send RRCConnectionReconfiguration or RRCReconfiguration to the UE, carrying an indicator of refusing to let the UE enable the mode of performing resource scheduling by UE and timer configuration information. After the UE receives RRCConnectionReconfiguration sent by the network device, the UE may start the timer based on the timer configuration information, and does not request for performing the scheduling by UE before the timer expires. On one hand, it may prevent the terminal device from repeatedly sending the request to the network device, which may occupies network resources and affect running speed of the network device, and on the other hand, the terminal devices may be managed effectively.

Figure 4:
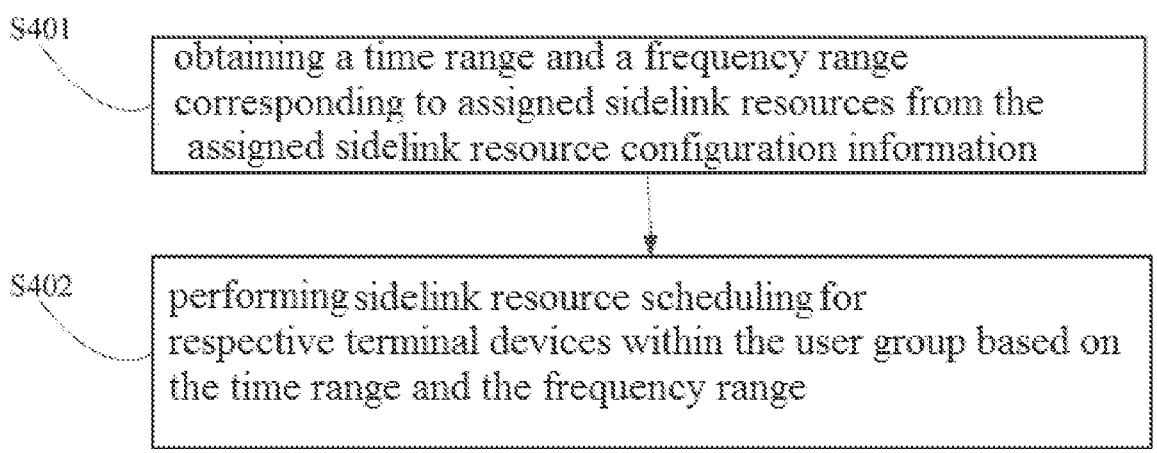
FIG. 4 is a schematic flowchart of step S100 of a method for requesting scheduling sidelink resources according to an embodiment of the present disclosure.

Further, in the embodiments of the present disclosure, FIG. 4 is a schematic flowchart of step S100 of a method for requesting scheduling sidelink resources according to an embodiment of the present disclosure. When the first response message is received from the network device, the sidelink resource scheduling for respective terminal devices within the user group may be performed based on the assigned sidelink resource configuration information as follows.

At block S401, a time range and a frequency range corresponding assigned sidelink resources are obtained from the assigned sidelink resource configuration information.

At block S402, the sidelink resource scheduling for respective terminal devices within the user group may be performed based on the time range and the frequency range.

As described above, the first response message may carry the assigned sidelink resource configuration information. After receiving the first response message, the terminal device on one hand may enable the mode of performing resource scheduling by UE, and on the other hand may obtain the sidelink resource configuration information in the first response message, and obtain the assigned time range and frequency range in which the communication can be performed.

After the terminal device obtains the time range and the frequency range, the terminal device may perform the sidelink resource scheduling for respective terminal devices within the user group. In other words, each of the other terminal devices within the user group may send a resource request to the terminal device which enables the mode of performing resource by UE, to obtain corresponding sidelink resources. The terminal device enabling the mode of performing resource scheduling by UE may perform the scheduling and assignment of sidelink resources for respective terminal devices within the user group, perform communication with each other terminal device within the user group including the terminal device, and perform communication with a terminal device within a different user group.

In conclusion, according to embodiments of the present disclosure, a request for performing resource scheduling by UE may be sent to a network device, in response to the network device approving, the resource scheduling may be performed for respective terminal devices within a user group based on resources assigned by the network device without the terminal devices requesting for respective resources from the network device respectively, such that a pressure of the network device is relieved while realizing reasonable assignment and scheduling of network resources.

Figure 5:
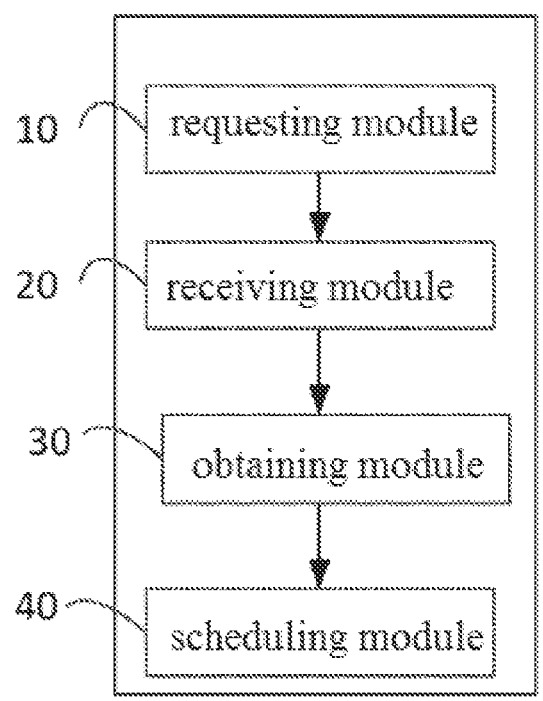
FIG. 5 is a block diagram of an apparatus for requesting scheduling sidelink resources according to an embodiment of the present disclosure.

FIG. 5 is a block diagram of an apparatus for requesting scheduling sidelink resources according to an embodiment of the present disclosure. As illustrated in FIG. 5, the apparatus includes a requesting module 10, a receiving module 20, an obtaining module 30 and a scheduling module 40.

The requesting module 10 is configured to send a sidelink terminal message to a network device, in which the sidelink terminal message includes a request initiated by a terminal device for performing sidelink resource scheduling by the terminal device.

The receiving module 20 is configured to receive a response message of the sidelink terminal message sent by the network device.

The obtaining module 30 is configured to, in response to the response message being a first response message indicating that the request from the terminal device is approved, obtain assigned sidelink resource configuration information from the first response message.

The scheduling module 40 is configured to perform sidelink resource scheduling for respective terminal devices within a user group including the terminal device based on the assigned sidelink resource configuration information.

In a possible implementation, the obtaining module is further configured to, in response to the response message being a second response message indicating that the request from the terminal device is rejected, obtain timer configuration information from the second response message.

The apparatus further includes a timing module, configured to start a timer based on the timer configuration information and suspend sending the sidelink terminal message to the network device before a timing time of the timer expires.

In a possible implementation, the sidelink terminal message further includes a group identifier of the user group, an identifier of each terminal device within the user group, and the number of scheduled terminal devices within the user group.

In a possible implementation, the scheduling module is further configured to obtain a time range and a frequency range corresponding to assigned sidelink resources from the assigned sidelink resource configuration information, and perform the sidelink resource scheduling for respective terminal devices within the user group based on the time range and the frequency range.

In a possible implementation, the first response message or the second response message is RRCConnectionReconfiguration or RRCReconfiguration.

Regarding the apparatus in the foregoing embodiment, the specific manner in which each module performs operations has been described in detail in the embodiments of the related method, and will not be elaborated here.

Figure 6:
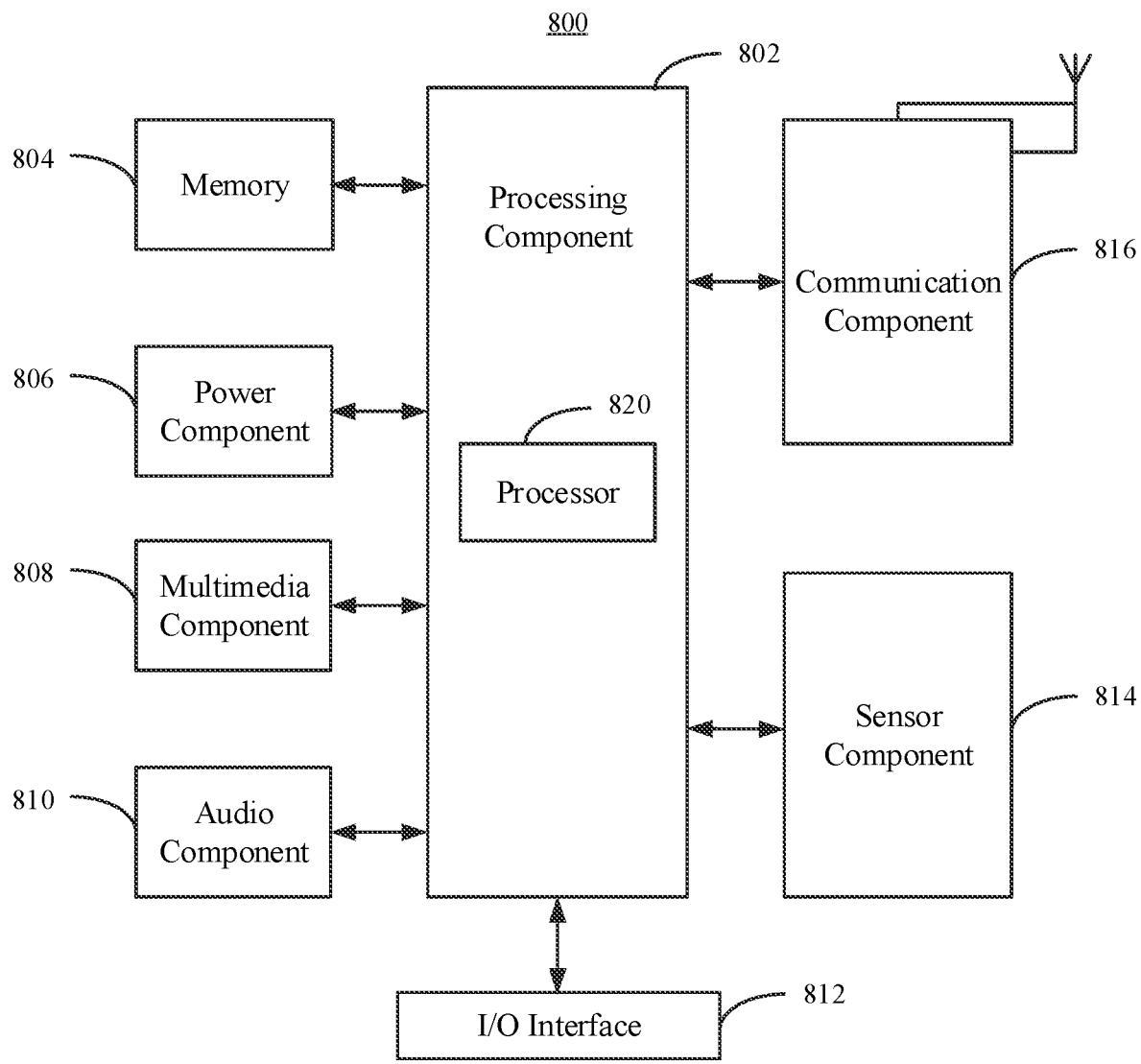
FIG. 6 is a block diagram of a device for requesting scheduling sidelink resources according to an embodiment of the present disclosure.

FIG. 6 is a block diagram of a device 800 for requesting scheduling sidelink resources according to an embodiment of the present disclosure. For example, the device 800 may be a mobile phone, a computer, a digital broadcast terminal, a messaging device, a gaming console, a tablet, a medical device, exercise equipment, a personal digital assistant, and the like.

Referring to FIG. 6, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as Wi-Fi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for requesting scheduling sidelink resources, applicable to a terminal device, comprising:
   sending a sidelink terminal message to a network device, wherein the sidelink terminal message comprises a request initiated by the terminal device for performing sidelink resource scheduling by the terminal device;
   receiving a response message corresponding to the sidelink terminal message sent by the network device;
   in response to the response message being a first response message indicating that the request from the terminal device is approved, obtaining assigned sidelink resource configuration information from the first response message; and
   performing sidelink resource scheduling for respective terminal devices within a user group including the terminal device based on the assigned sidelink resource configuration information;
   the method of claim further comprising:
   in response to the response message being a second response message indicating that the request of the terminal device is rejected, obtaining timer configuration information from the second response message;
   starting a timer based on the timer configuration information and suspending sending the sidelink terminal message to the network device before the timer expires.

2. The method of claim 1, wherein the sidelink terminal message further comprises a group identifier of the user group, an identifier of each terminal device within the user group, and the number of scheduled terminal devices within the user group.

3. The method of claim 1, wherein the performing the sidelink resource scheduling for respective terminal devices within the user group including the terminal device based on the assigned sidelink resource configuration information comprises:
   obtaining a time range and a frequency range corresponding to assigned sidelink resources from the assigned sidelink resource configuration information; and
   performing the sidelink resource scheduling for respective terminal devices within the user group based on the time range and the frequency range.

4. The method of claim 1, wherein, each of the first response message and the second response message is selected from the group consisting of
   RRCConnectionReconfiguration; and
   RRCReconfiguration.

5. The method of claim 1, wherein the sending the sidelink terminal message to the network device comprises:
   sending the sidelink terminal message to the network device based on a broadcast message received from the network device.

6. The method of claim 1, further comprising:
   determining terminal devices for which sidelink resources need to be scheduled within the user group.

7. The method of claim 6, wherein the determining the terminal devices for which the sidelink resources need to be scheduled within the user group comprises:

sending querying information to another terminal device within the user group; and determining that the sidelink resource needs to be scheduled for the another terminal device when receiving return information indicating that the sidelink resource needs to be scheduled for the another terminal device.

8. The method of claim 6, wherein the determining the terminal devices for which the sidelink resources need to be scheduled within the user group comprises:

determining that the sidelink resource needs to be scheduled for another terminal device when receiving a request for sidelink resources from the another terminal device.

9. A device for requesting scheduling sidelink resources, comprising:

a processor; and a memory for storing instructions executable by the processor;

wherein the processor is configured to perform the method for requesting scheduling of side-link resources, comprising:

sending a sidelink terminal message to a network device, wherein the sidelink terminal message comprises a request initiated by the terminal device for performing sidelink resource scheduling by the terminal device;

receiving a response message corresponding to the sidelink terminal message sent by the network device;

in response to the response message being a first response message indicating that the request from the terminal device is approved, obtaining assigned sidelink resource configuration information from the first response message; and performing sidelink resource scheduling for respective terminal devices within a user group including the terminal device based on the assigned sidelink resource configuration information;

wherein the processor is configured to further perform:

in response to the response message being a second response message indicating that the request of the terminal device is rejected, obtaining timer configuration information from the second response message;

starting a timer based on the timer configuration information and suspending sending the sidelink terminal message to the network device before the timer expires.

10. The device of claim 9, wherein the sidelink terminal message further comprises a group identifier of the user group, an identifier of each terminal device within the user group, and the number of scheduled terminal devices within the user group.

11. The device of claim 9, wherein the performing the sidelink resource scheduling for respective terminal devices within the user group including the terminal device based on the assigned sidelink resource configuration information comprises:

obtaining a time range and a frequency range corresponding to assigned sidelink resources from the assigned sidelink resource configuration information; and performing the sidelink resource scheduling for respective terminal devices within the user group based on the time range and the frequency range.

12. The device of claim 9, wherein, each of the first response message and the second response message is selected from the group consisting of RRCConnectionReconfiguration; and RRCReconfiguration.

13. A non-transitory computer readable storage medium, wherein when instructions in the storage medium are executed by a processor, the processor is caused to perform the method for requesting scheduling of side-link resources, comprising:

sending a sidelink terminal message to a network device, wherein the sidelink terminal message comprises a request initiated by the terminal device for performing sidelink resource scheduling by the terminal device;

receiving a response message corresponding to the sidelink terminal message sent by the network device;

in response to the response message being a first response message indicating that the request from the terminal device is approved, obtaining assigned sidelink resource configuration information from the first response message; and performing sidelink resource scheduling for respective terminal devices within a user group including the terminal device based on the assigned sidelink resource configuration information;

wherein the processor is further caused to perform:

in response to the response message being a second response message indicating that the request of the terminal device is rejected, obtaining timer configuration information from the second response message;

starting a timer based on the timer configuration information and suspending sending the sidelink terminal message to the network device before the timer expires.

14. The non-transitory computer readable storage medium of claim 13, wherein the sidelink terminal message further comprises a group identifier of the user group, an identifier of each terminal device within the user group, and the number of scheduled terminal devices within the user group.

15. The non-transitory computer readable storage medium of claim 13, wherein the performing the sidelink resource scheduling for respective terminal devices within the user group including the terminal device based on the assigned sidelink resource configuration information comprises:

obtaining a time range and a frequency range corresponding to assigned sidelink resources from the assigned sidelink resource configuration information; and performing the sidelink resource scheduling for respective terminal devices within the user group based on the time range and the frequency range.

16. The non-transitory computer readable storage medium of claim 13, wherein, each of the first response message and the second response message is selected from the group consisting of RRCConnectionReconfiguration; and RRCReconfiguration.

* * * * *